United States Patent [19]
Jordan

[11] Patent Number: 5,592,171
[45] Date of Patent: Jan. 7, 1997

[54] WIND PROFILING RADAR

[75] Inventor: James R. Jordan, Boulder, Colo.

[73] Assignee: The United States of America as represented by the Secretary of Commerce, Washington, D.C.

[21] Appl. No.: 516,219

[22] Filed: Aug. 17, 1995

[51] Int. Cl.⁶ ................................... G01S 13/95
[52] U.S. Cl. ............... 342/26; 342/192; 342/193; 342/196
[58] Field of Search .................. 342/26, 460, 192, 342/193, 194, 195, 196

[56] References Cited

U.S. PATENT DOCUMENTS

| | | | |
|---|---|---|---|
| 4,728,952 | 3/1988 | Residois | 342/26 |
| 4,742,353 | 5/1988 | D'Addio et al. | 342/159 |
| 4,835,536 | 5/1989 | Piesinger et al. | 342/26 |
| 4,881,020 | 3/1989 | Montheil | 342/159 |
| 4,881,077 | 11/1989 | Jehle et al. | 342/26 |
| 4,887,088 | 12/1989 | Beckett | 342/128 |
| 4,965,585 | 10/1990 | Lepere et al. | 342/160 |
| 5,000,183 | 3/1991 | Bonnefous | 128/660.01 |
| 5,038,145 | 8/1991 | DeCesare et al. | 342/93 |
| 5,124,930 | 6/1992 | Nicolas et al. | 364/485 |
| 5,128,904 | 7/1992 | Chambers | 367/129 |
| 5,164,731 | 11/1992 | Borden et al. | 342/26 |
| 5,179,542 | 1/1993 | Reese et al. | 367/135 |
| 5,392,255 | 2/1995 | LeBras et al. | 367/50 |
| 5,412,741 | 5/1995 | Shapiro | 382/232 |
| 5,453,945 | 9/1995 | Tucker et al. | 364/725 |
| 5,481,269 | 1/1996 | Imhoff et al. | 342/90 |
| 5,486,833 | 1/1996 | Barrett | 342/204 |

OTHER PUBLICATIONS

W. H. Press et al, "Wavelet Transform", *Numerical Recipes in C, Second Edition*, Cambridge University Press, 1992, pp. 591–601.

Strauch et al, "The Colorado Wind–Profiling Network", *Journal of Atmospheric and Oceanic Technology*, V. 1, No. 1, Mar. 1984, pp. 37–49.

Dušan S. Zrnić, "Simulation of Weatherlike Doppler Spectra and Signals" *Journal of Applied Meterology*, V. 14, Jun. 1975, pp. 619–620.

*Primary Examiner*—John B. Sotomayor
*Attorney, Agent, or Firm*—Michael de Angeli

[57] ABSTRACT

Clutter present in radar return signals as used for wind profiling is substantially removed by carrying out a Daubechies wavelet transformation on a time series of radar return signals. The smoothly varying nature of the return from clutter provides a relatively small number of high amplitude components in the wavelet transformation, which are truncated to remove the clutter. Inverse transformation yields a time series having had a significant amount of clutter removed, without distortion of the radar return from turbulence, which can then be processed to provide useful wind profile data.

6 Claims, 9 Drawing Sheets

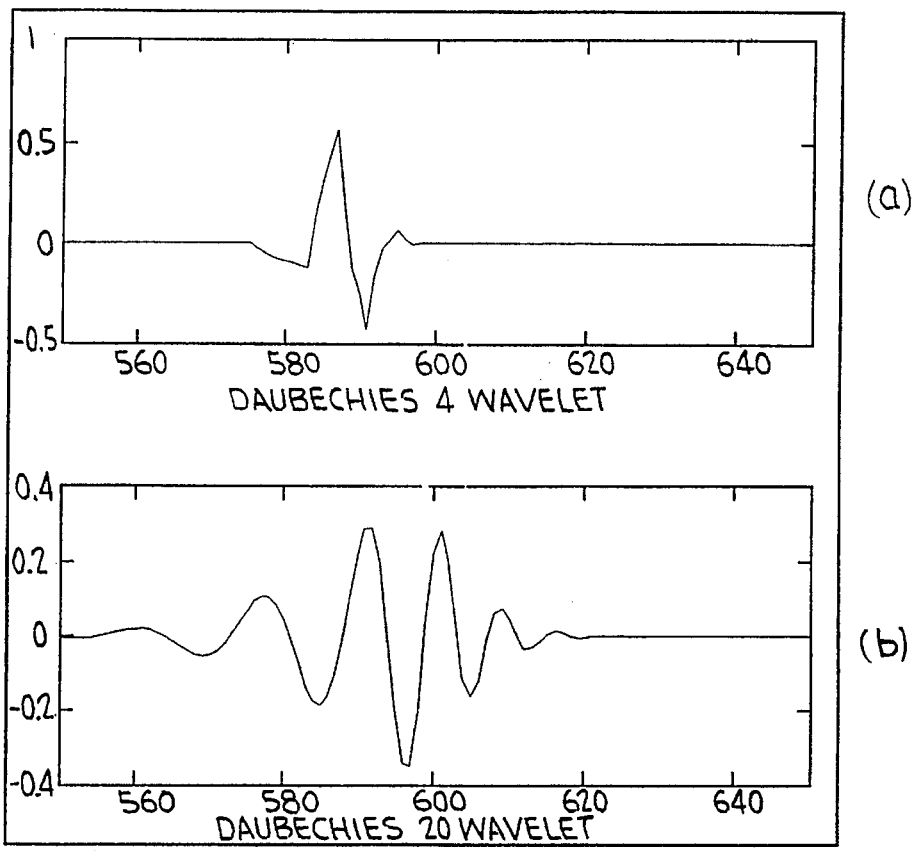
Figure 2. Examples of Daubechies 4 and 20 wavelets.
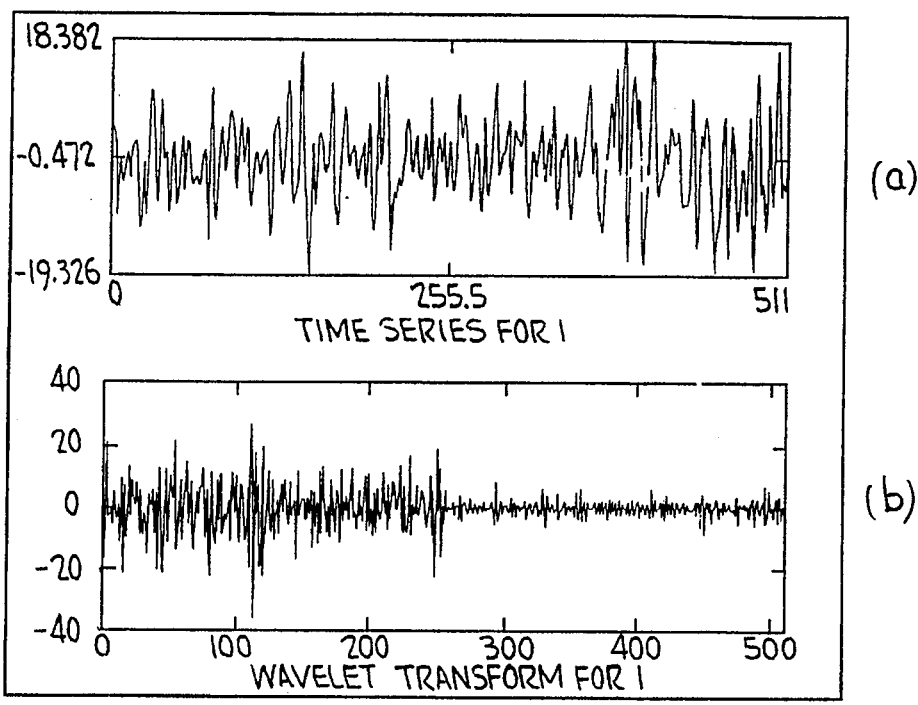
Figure 3. Simulated time series for clear air signal and its wavelet transform.

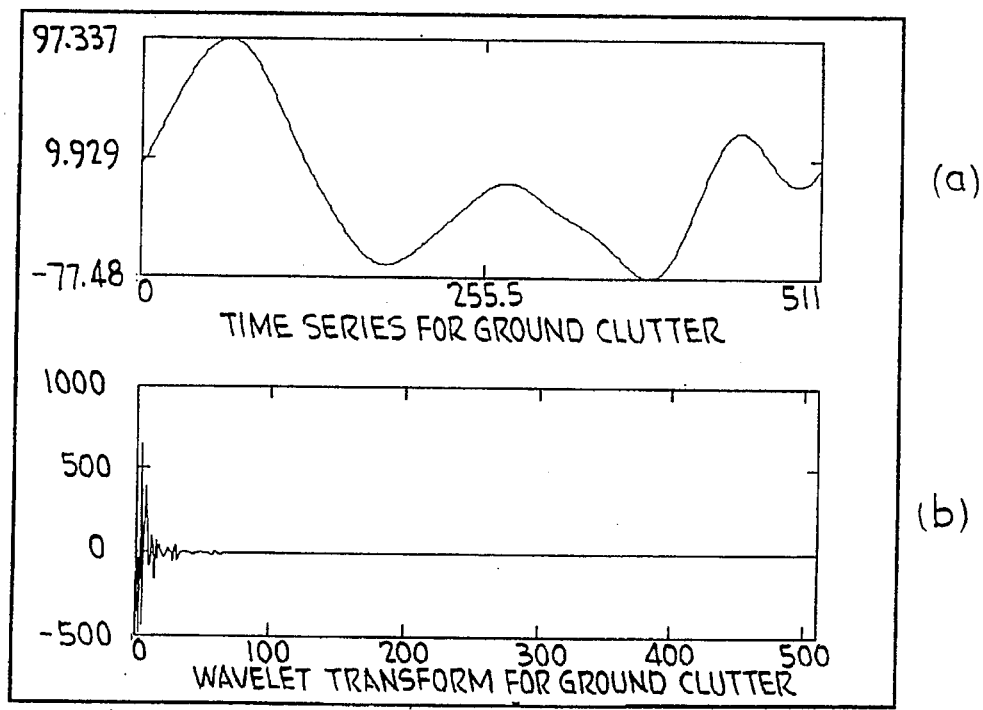
Figure 4. Simulated time series for ground clutter and its wavelet transform.
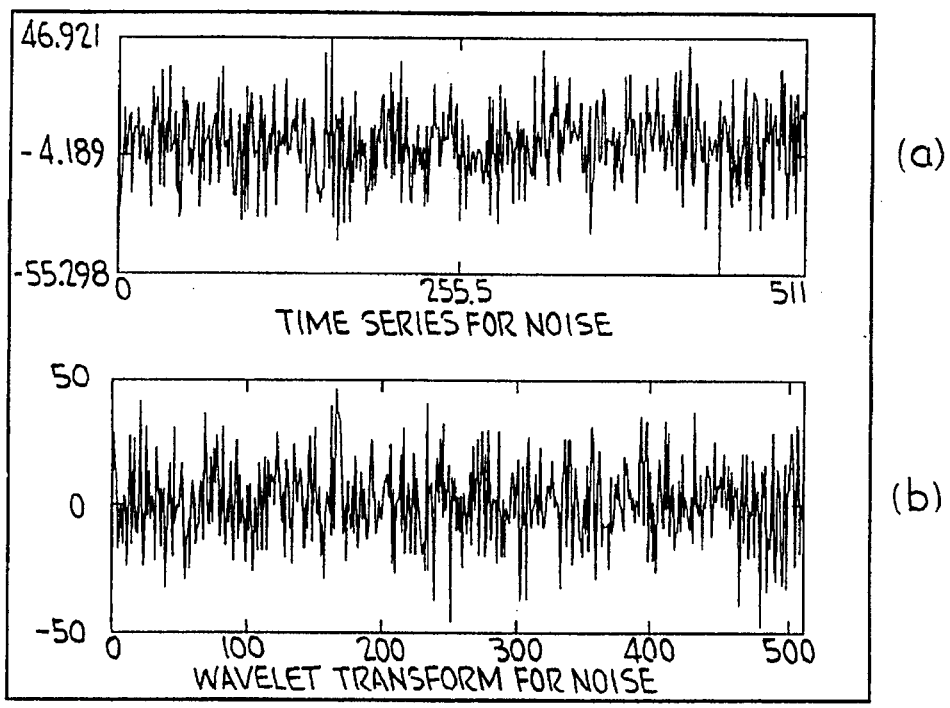
Figure 5. Simulated time series for noise and its wavelet transform.

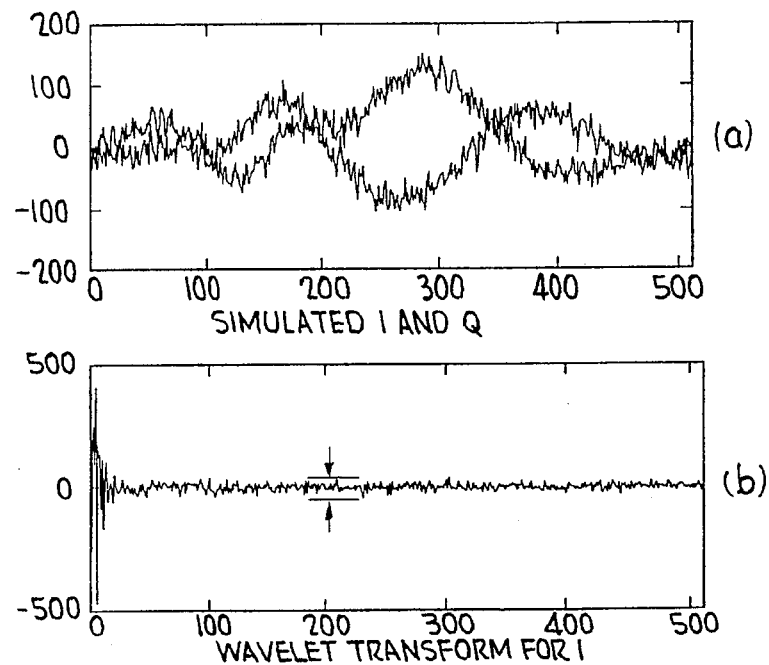
Figure 6. Simulated radar signals I and Q with ground clutter contamination and the wavelet transform of I.
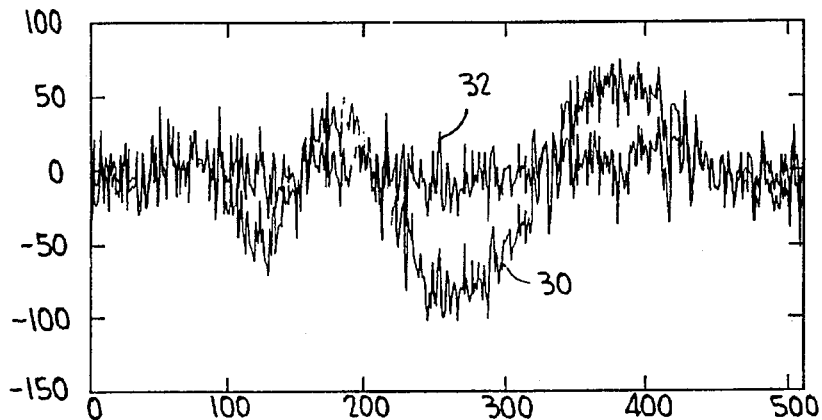
Figure 7. Simulated I time series before and after filtering.
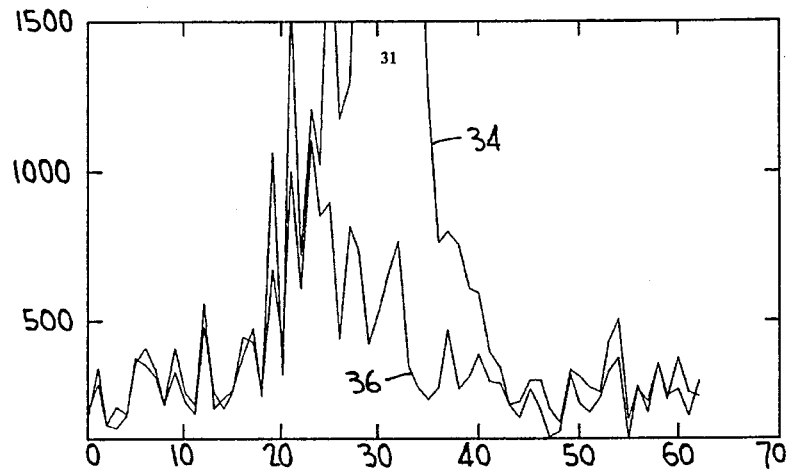
Figure 8. Power spectra for simulated data.

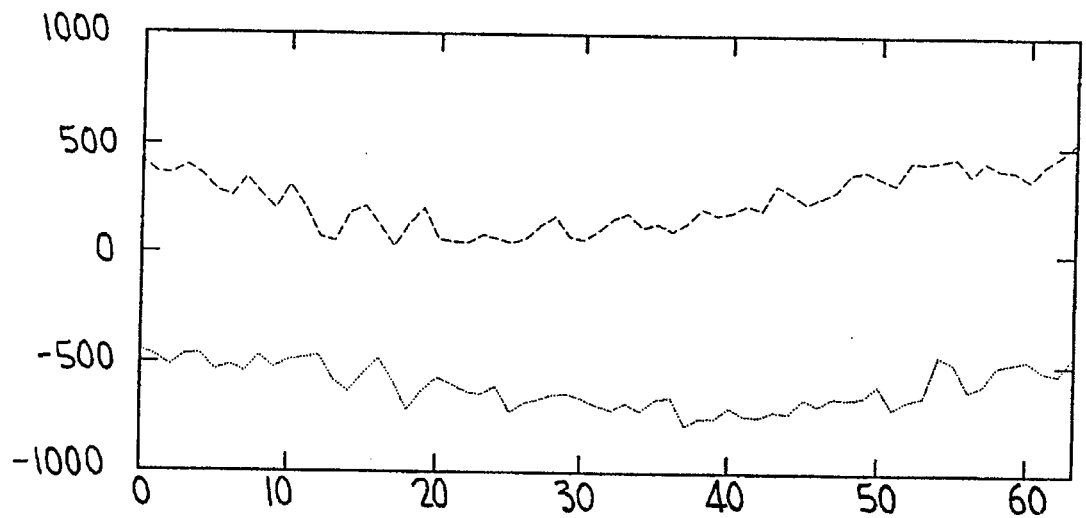
FIG. 9  I AND Q FOR GROUND CLUTTER CONTAMINATION
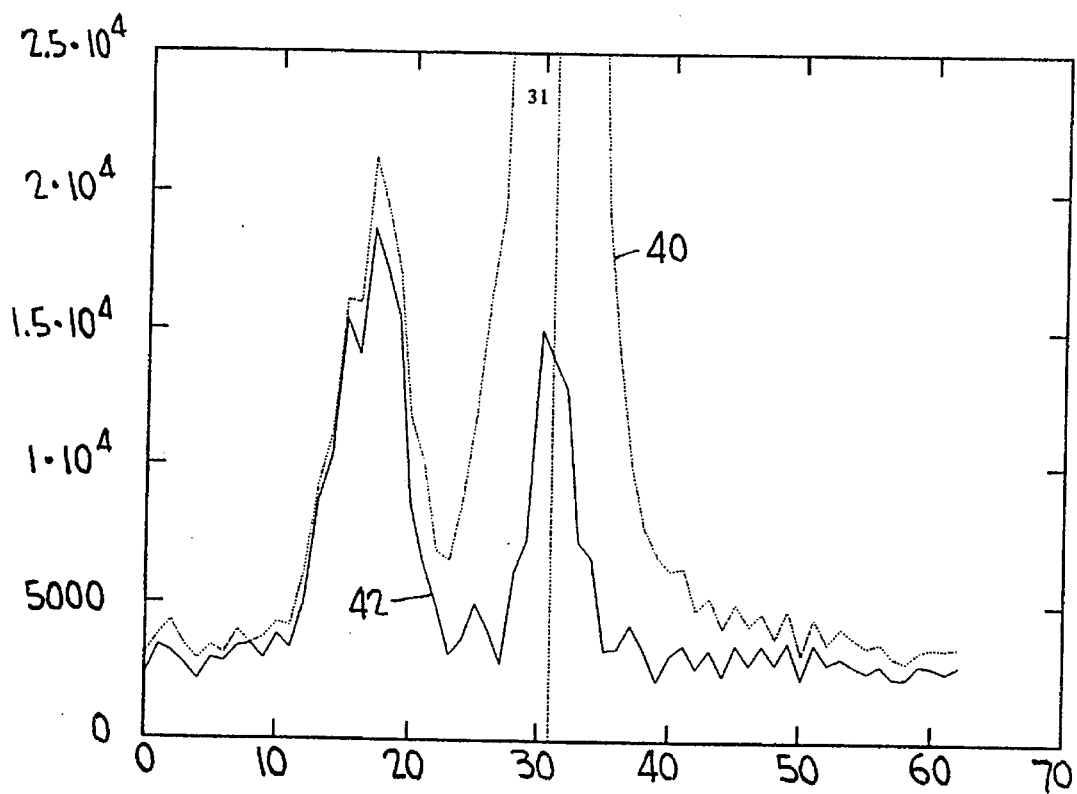
FIG. 10  POWER SPECTRA FILTERED AND NOT FILTERED

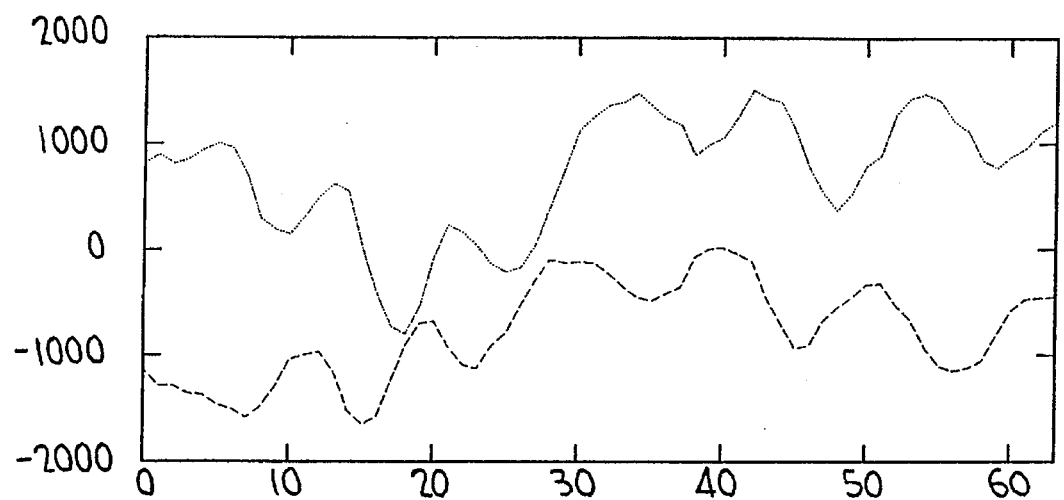
FIG. 11 I AND Q FOR SEA CLUTTER
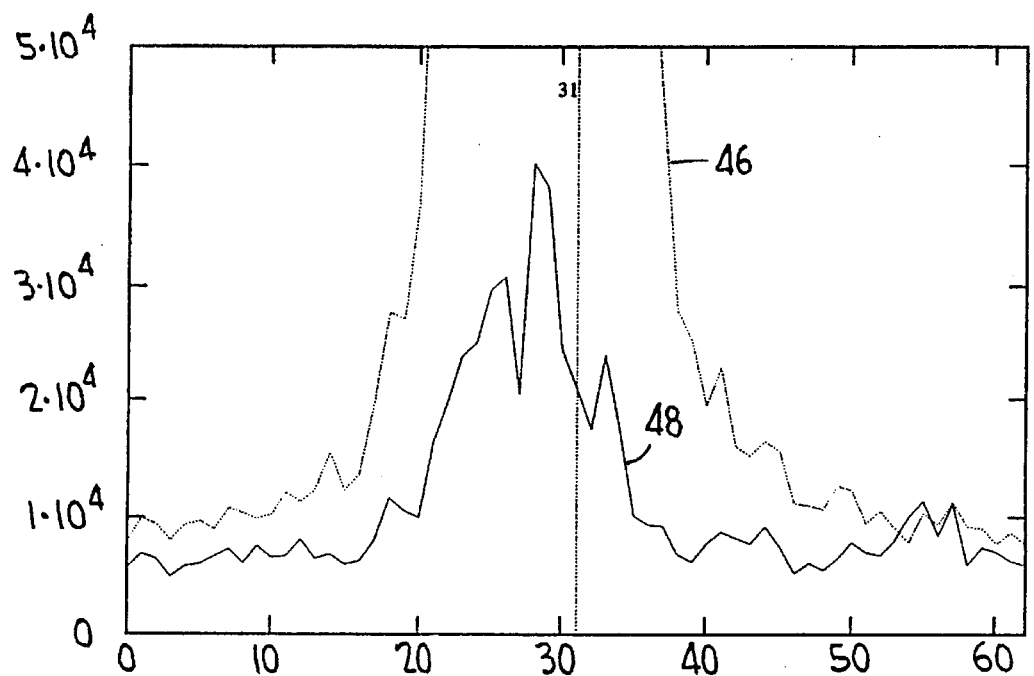
FIG. 12 POWER SPECTRA FILTERED AND NOT FILTERED

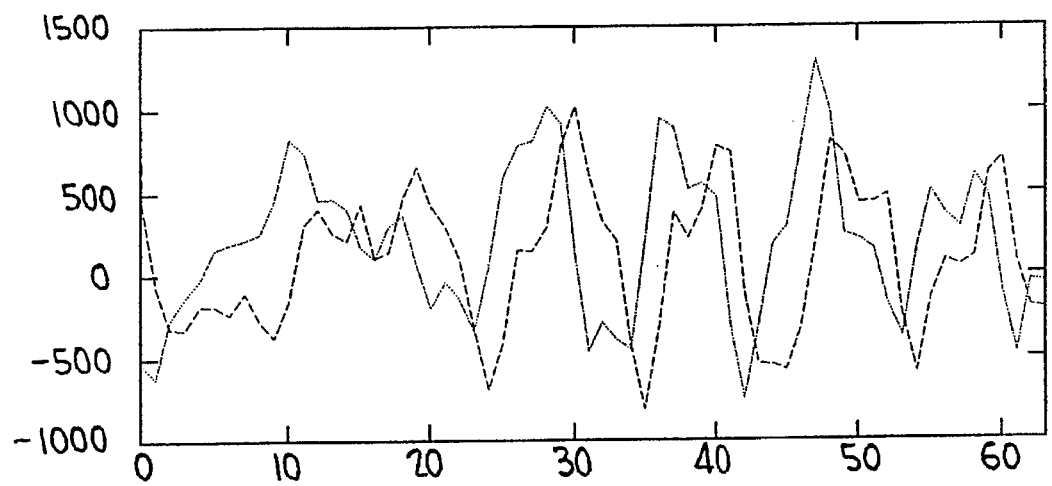
FIG. 13  I FOR BIRD CONTAMINATION
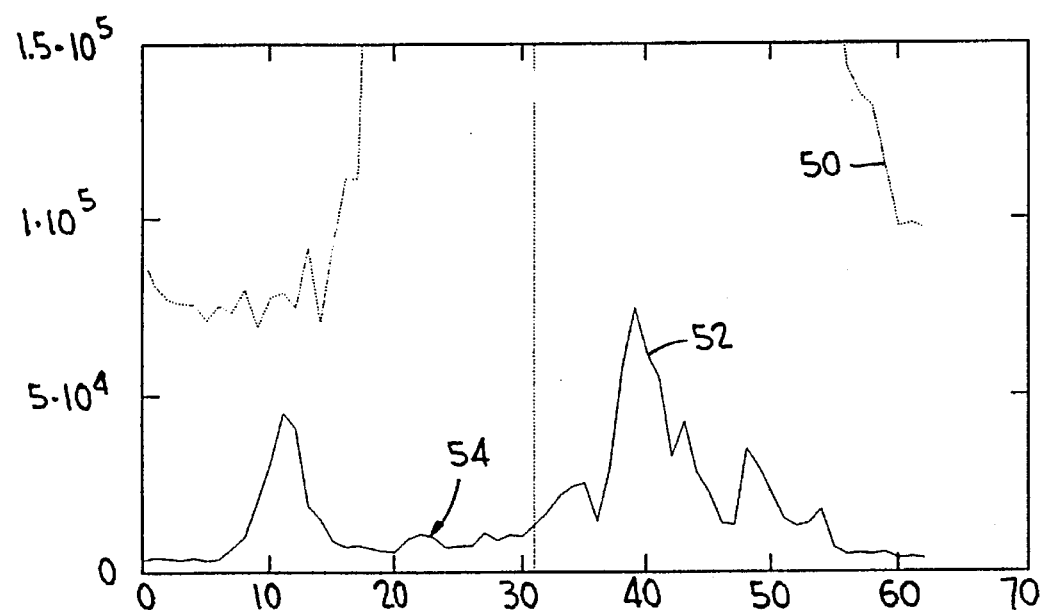
FIG. 14  POWER SPECTRA FILTERED AND NOT FILTERED

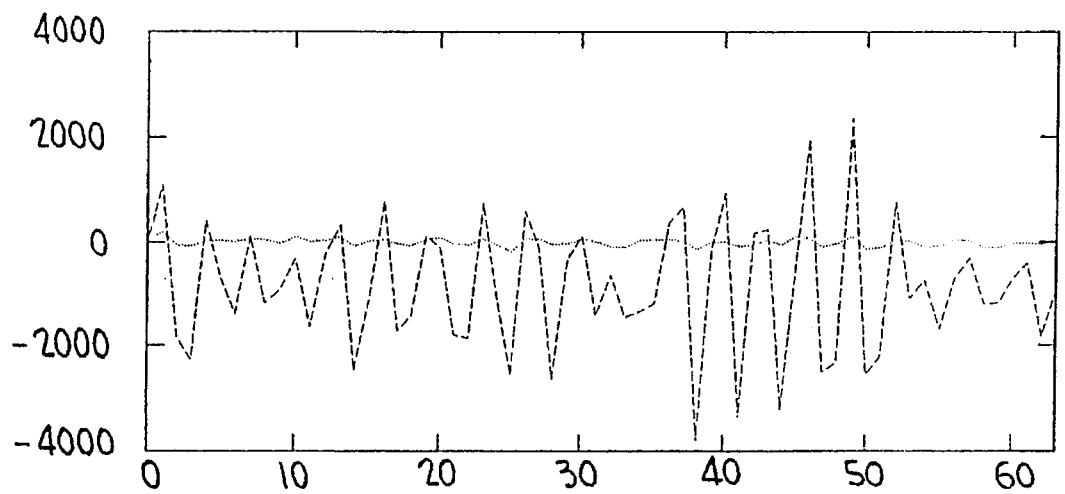
FIG. 15 I FOR PRECIPITATION, DASHED LINE BEFORE FILTER, DOTTED LINE AFTER FILTER.
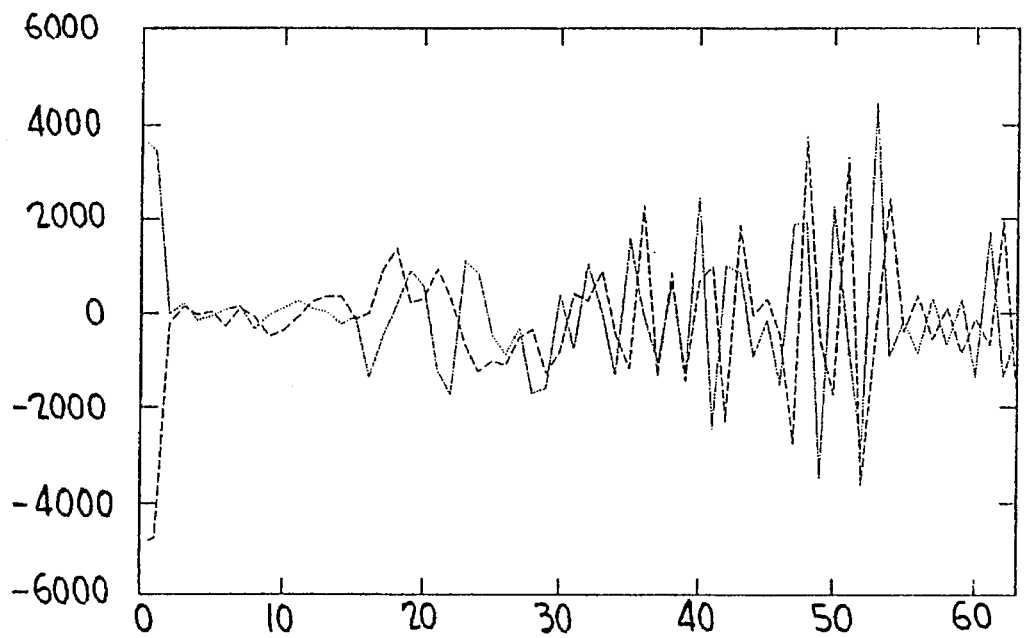
FIG. 16 WAVELET TRANSFORM OF I (DASHED LINE) AND Q (DOTTED LINE).

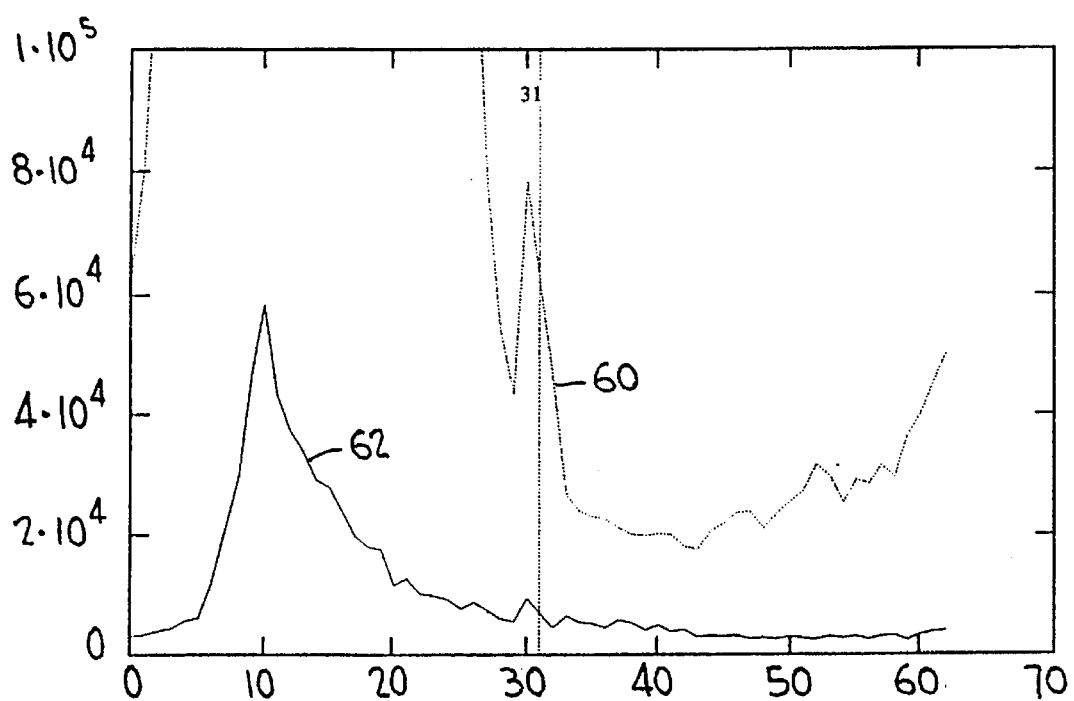
FIG. 17 POWER SPECTRA FILTERED AND NOT FILTERED

WIND PROFILING RADAR

FIELD OF THE INVENTION

This invention relates to improvements in the accuracy of wind profiling studies performed using radar. More specifically, this invention relates to improvements in the accuracy of wind data collected using radar techniques, by reducing the relative amplitude of the radar return signal from the ground and other sources of "clutter" in the return signal, such as reflection from the ocean surface, or from birds, airplanes, and precipitation.

BACKGROUND OF THE INVENTION

There are many applications for accurate wind profile information. Knowledge of the immediate and prevailing wind patterns is important for studying movement of air pollution and the like, for optimizing fire fighting efforts, for planning aircraft flight patterns to reduce fuel consumption, and for prediction of wind shear and other possibly dangerous wind conditions for flying, as well as for better weather prediction.

Radar systems for wind profiling have been in operation for more than a decade, at a number of locations. See Strauch et al, "The Colorado Wind-Profiling Network", *J. Atmospheric and Oceanic Tech.*, Vol. 1, no. 1, March 1984. The Strauch et al reference discusses in detail the practice of wind profiling and also provides details and examples of a network of five wind profiling radars in the Colorado area. The present invention relates generally to improvement of the understanding of data gathered using this or similar wind profiling radar systems; where details of the method of the invention are not set forth in detail, they are generally as disclosed by Strauch et al.

The basic process for monitoring the velocity of winds in the atmosphere using radar is as follows. Pulses of high-frequency power are directed into selected areas of the sky at regular intervals. Power back-scattered from all manner of reflectors, including birds, aircraft, wires, and foliage, as well as the ground, the sea, buildings, and the like is detected. Various processes are known for separating the components of the total power received according to the various reflectors.

Radar pulses reflected from turbulence in the atmosphere can be detected and discriminated to provide indication of the wind velocity. More specifically, some of the radar power in the pulses is reflected back toward the transmitting antenna by turbulence, that is, by temperature and humidity gradients in the atmosphere. Since the turbulence is distributed randomly throughout the region of the atmosphere illuminated by the transmitted pulses, the back-scattered return signal measured by the radar exhibits rapid fluctuations. By comparison, signals returned from point reflectors such as airplanes, or from ground clutter, that is, reflection from the ground, buildings, power lines, or foliage, are normally sine waves with little randomness.

More specifically, the wind velocity at any particular point in time and space is measured responsive to the Doppler shift of the received reflected electromagnetic radar pulses. The Doppler shift is determined by the difference in frequency between the transmitted and received signals. The difference in frequency is split into two channels, the in-phase or I and quadrature-phase or Q channels. Comparison of these two values allows determination of the wind direction. Typically, a series of I and Q values are sampled to produce a time series 64 samples long. The Fourier transform of this set of samples is then calculated to determine a Doppler spectrum of that set of samples. This process may be repeated 25–100 times, the whole process consuming 15–60 seconds, and the spectra thus generated summed to produce an averaged Doppler signal indicating the average velocity of the wind in that particular region of the atmosphere at that particular time. This process is then repeated at a number of regions of the atmosphere and over a period of time, to generate a complete wind profile. See, e.g., FIG. 10 of the Strauch et al paper.

In copending application Ser. No. 08/470,546, filed Jun. 6, 1995, the same inventor teaches methods of reducing the relative amplitude of the clutter in radar return signals, that is, relatively emphasizing the return signal from turbulence, and thereby improving the signal-to-clutter ratio of the meteorological return. This in turn leads to more accurate wind profile information. The present invention also relates to improvement in the signal-to-clutter ratio of the radar return from turbulence by reducing the return from clutter.

OBJECTS OF THE INVENTION

It is therefore an object of the invention to provide improved radar evaluation of wind, that is, to provide improved wind profile data, by effectively de-emphasizing the return from clutter with respect to the return from meteorological reflectors.

It is a more specific object of the invention to reduce the amount of radar return from clutter in the return signals processed using conventional techniques to yield wind profile information by recognition of the difference in kind between the return from clutter and the return from meteorological reflectors.

SUMMARY OF THE INVENTION

According to the present invention, the relative amplitude of the return signal from clutter is de-emphasized with respect to the radar return signal from meteorological reflectors by wavelet transform techniques. Wavelet transformation is a known mathematical technique for decomposing a time series of measured values into a sum of wavelets with different amplitudes. In effect, a predetermined mathematical function is compared to received data, in order to evaluate the correlation of the received data to the known function. The effect is to identify characteristic patterns in the received data corresponding to the chosen wavelet.

Wavelet decomposition according to the invention is useful because the radar return signal from clutter is smoothly varying relative to the radar return signal from turbulence. More specifically, wavelet decomposition effectively separates out the smoothly varying clutter contribution to the total radar return signal from the relatively random return component due to turbulence. Because the clutter is in effect a return from more stable reflectors than from turbulence in the air, the radar return signal from clutter varies relatively slowly from one instant of time to the next, as compared to the radar return from turbulence, which is relatively random.

According to the present invention, the smoothly-varying nature of the clutter is exploited to identify the return from clutter in the radar signal, such that the clutter can be de-emphasized, increasing the signal-to-clutter ratio of the return from turbulence, and enabling the turbulence signal to be processed more accurately. The return from clutter is identified by mathematically decomposing the received signal into a sum of known wavelets, in particular, so-called "Daubechies" wavelets. The amplitudes of these wavelets form a set of wavelet components, which are relatively large when the correlation between the wavelet and the signal being examined is relatively high. The Daubechies wavelets approximate the return from clutter and therefore exhibit relatively high amplitude components responsive to clutter. These high amplitude components are truncated, and the remaining set of components is then inversely transformed, yielding a signal corresponding to the original radar return having had a substantial fraction of the clutter removed. The resultant signal therefore relatively emphasizes the return from turbulence, which can then be processed in the usual way to yield a more reliable wind velocity profile.

BRIEF DESCRIPTION OF THE DRAWINGS

The invention will be better understood if reference is made to the accompanying drawings, in which:

FIGS. 2(a) and 2(b) give examples of Daubechies 4- and 20-term wavelets;

FIG. 3 provides simulated time series for a clear air signal and its wavelet transform;

FIG. 4 is an example of a simulated time series for ground clutter and its wavelet transform;

FIG. 5 is a simulated time series for noise and its wavelet transform;

FIG. 6 shows simulated I and Q time series including ground clutter contamination and the wavelet transform of the I signal;

FIG. 7 shows a simulated I time series including ground clutter before and after filtering according to the invention;

FIG. 8 shows corresponding power spectra;

FIG. 9 shows measured I and Q time series for ground clutter;

FIG. 10 shows the power spectra thereof, with and without filtering according to the invention;

FIG. 11 shows I and Q time series for sea clutter;

FIG. 12 shows the power spectra thereof, before and after filtering according to the invention;

FIG. 13 shows I and Q time series including bird contamination;

FIG. 14 shows power spectra thereof, filtered and not filtered according to the invention;

FIG. 15 shows an I time series for precipitation before and after filtering according to the invention;

FIG. 16 shows wavelet transforms of I and Q time series for precipitation-contaminated return signals; and FIG. 17 shows the power spectra thereof, filtered and not filtered according to the invention.

DESCRIPTION OF THE PREFERRED EMBODIMENTS

Figure 1:
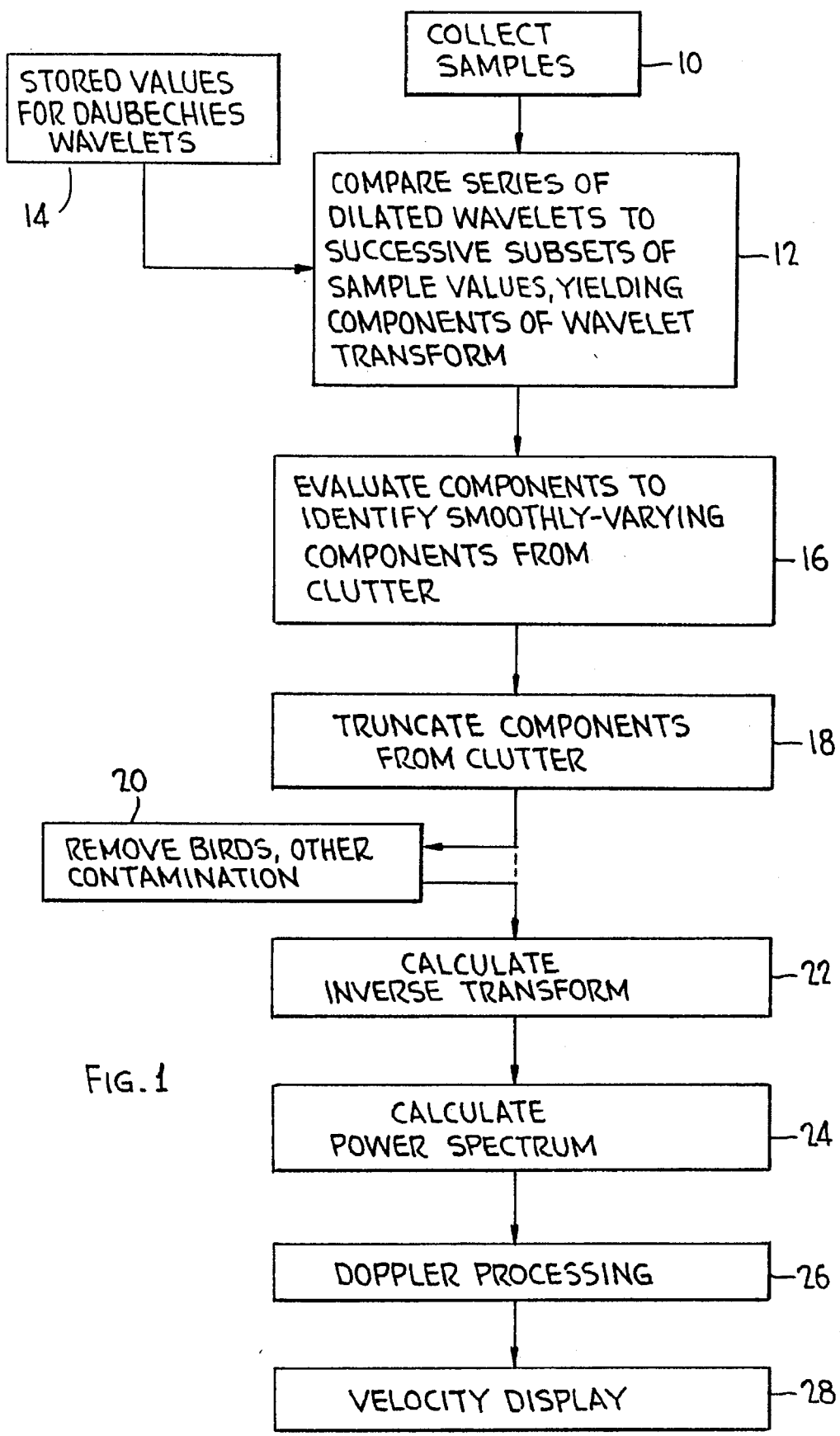
FIG. 1 shows an overview of processing operations according to the invention.

As set forth briefly above, the fact that the radar return signal from ground clutter varies slowly with respect to the return from meteorological reflectors is exploited according to the invention. More specifically, in order to generate a value for the velocity and direction of wind using a radar signal, a beam of high frequency energy is transmitted into a selected region of the sky, and the return energy reflected from various objects thus illuminated is measured. The usual radar return signal includes components reflected from clutter, including in this term such reflectors as trees, power lines, the ground, buildings, and the ocean, as well as moving targets such as birds or aircraft, and meteorological reflectors, such as clear air turbulence or rain. Accurate measurement of the return from meteorological reflectors is critical in measuring wind velocity. Therefore the object of a wind profiling radar is to separate reliably the radar return signal from meteorological reflectors from that due to clutter and from moving targets.

It will be appreciated, of course, that much of radar signal processing is devoted to moving target identification (MTI), to identify targets such as aircraft in order to separate these from other sources of reflected energy. It is a relatively simple matter to separate clutter due to the land, vegetation, power lines, the ocean and the like from moving targets; a high-pass filter removes the low frequency Doppler reflection from relatively stationary reflectors, leaving only the much higher Doppler velocities engendered by moving targets such as birds or aircraft. However, this solution is insufficient to separate the radar return from clutter from that due to meteorological reflectors, since the Doppler velocities thereof are relatively closely related. Stated differently, a high-pass filter will remove the radar return from clutter and also that from wind.

As shown by the Figures discussed below, the radar return from turbulence appears to be random noise superimposed on the generally sinusoidal return from clutter. Accordingly, it might seem that a band-pass filter might be suitable for passing the return from turbulence while removing the clutter. In fact, however, the Doppler velocity of the turbulence is comparable to that of the clutter, so that filtering would remove both.

The present inventor discloses in copending Ser. No. 08/470,546, one aspect of the present invention, namely that the radar return from clutter has a much longer decorrelation time than the radar return from turbulence. Stated differently, the radar return signal from clutter is much more stable over a longer period of time than the return from turbulence; this is hardly surprising, given that turbulence is an inherently random phenomenon, whereas clutter is relatively predictable, albeit with substantial high frequency variation, e.g., from waves on the ocean, movement of trees, power lines, and the like. According to the invention of copending Ser. No. 08/470,546, a polynomial is generated, that is, a mathematical "fit" to the clutter is derived, allowing removal of the clutter mathematically.

According to the present invention, the slowly varying nature of the return from clutter is modeled in a more subtle and more effective mathematical fashion. Wavelet filtering is used according to the invention for separating the return due to clutter from that due to turbulence, which again is effective because the decorrelation time of the clutter is longer than that of the turbulence.

Daubechies wavelets are employed in the preferred embodiment of the invention to identify slowly varying components in the radar return signal due to clutter. Daubechies wavelets are used in preference to other known wavelets, principally because Daubechies wavelets are described mathematically in a relatively small number of terms, reducing the amount of computation required with respect to other sorts of wavelets which might be employed. When Daubechies wavelets are employed to calculate wavelet transforms with respect to radar return signals including clutter, large amplitude correlation components are determined, indicative of good correlation between the Daubechies wavelets and the slowly-varying fraction of the reflected radar return energy. The large-amplitude components of the wavelet transform can then be truncated, effectively removing most of the radar return due to clutter from the signal. The remaining wavelet transform is then inversely transformed, being reconstituted as a set of samples suitable for conventional Doppler processing to yield a more reliable value for the velocity of wind.

The process is summarized in FIG. 1, as follows. At step 10, a time series of samples is collected. Each time series consists of a set of numbers, each of which is responsive to the amount of reflected radar energy detected in response to a pulse of high frequency (e.g., 915 MHz) energy transmitted into a portion of the sky. Each of the samples of a particular time series is similarly range-gated, that is, each sample represents reflected energy as measured at equal intervals of time from the time of transmission of the corresponding pulses. As the interval is determinative of the distance of the region of sky from which the pulse is reflected, each sample of each time series is representative of reflection from the same region of the sky.

At step 12, subsets of these samples are decomposed by comparison to values representative of the preferred Daubechies wavelets, stored as indicated at 14. The decomposition process simply involves multiplication of the value of each of a subset of the samples by corresponding values representative of the amplitude of the wavelet. This process is repeated for a series of differently-dilated versions of the wavelet; that is, in successive comparison steps the wavelet is (typically) "stretched" in time with respect to the series of sample values. The wavelet decomposition process can be carried out as described in Press, W. H., Teukolsky, S. A., Vetterling, W. T., Flannery, B. P., *Numerical Recipes in C, Second Edition,* 1992, Cambridge University Press, Victoria, Australia. In each comparison step, the value of each of a subset of the sample values is multiplied by a corresponding value for the instantaneous amplitude of the dilated wavelet. The result of each set of multiplications are summed; each sum represents the degree of similarity of each of the subset of the samples to the wavelet at that particular dilation. The sum is termed a component. Where the series of values characterizing the shape of the wavelet closely corresponds to the values of the particular subset of samples, a high component value is calculated. The process is then repeated for the same set of samples with the wavelet differently dilated, and for other subsets of the samples of the time series; the complete collection of components is termed the wavelet transform.

Because the return signal from clutter is slowly varying, wavelet transforms calculated in this manner using the Daubechies wavelets will include one or more high-amplitude components calculated when the dilated wavelet corresponds closely to the return present in the samples due to clutter. These relatively high amplitude components are identified at step 16, simply by comparison to a threshold T, and are truncated at step 18, effectively removing the components due to the clutter.

In a complete wind profiling process, additional processing can be carried out to remove return due to birds or the like, using known processing techniques, as indicated by optional step 20, not per se part of the present invention.

The inverse transformation is carried out at step 22, that is, the inverse wavelet transformation process is carried out, effectively reconstituting the truncated set of components as a set of samples, having had most of the radar return signal due to the clutter removed.

The reconstituted set of samples can then be processed at 24, to calculate their power spectrum; this is Doppler processed at 26 to yield a set of values for wind velocity, as indicated at 28, and as generally well known in the art.

Those of skill in the art will be able to implement the invention given the above description thereof and additional details provided in connection with the Figures described below.

FIGS. 2(*a*) and 2(*b*) provide examples of Daubechies 4- and 20-term wavelets, respectively. That is to say, the Daubechies 4-term wavelet shown in FIG. 2(*a*) may be represented by a series of four numbers. The Daubechies 20-term wavelet of FIG. 2(*b*) is similarly represented by 20 values. Wavelet decomposition of a series of radar return samples can be performed by simply multiplying each of the numbers representing the amplitude of the Daubechies wavelet by correspondingly-spaced values for the instantaneous amplitude of the radar return signal, that is, by individual ones of the subsets of samples making up the time series. The results of each of these (say) 20 multiplications performed with respect to a subset of the samples are then summed, generating a single value for the correlation of the wavelet with that particular subset of the set of samples. This value becomes a single component of the wavelet transform.

The same process is then carried out with respect to the next adjoining subset of the set of samples, effectively stepping the wavelet along the time series of sample values, so that a second component is generated. The wavelet is dilated, that is, the spacing of the samples of the wavelet with respect to the detected return samples is varied, typically divided, and this process repeated until all possible subsets of the set of samples making up the time series have been thus processed with respect to a number of variably-dilated wavelets, to yield a wavelet transform including a corresponding number of components. This process is referred to herein as computing a wavelet transform of the time series of samples employing the Daubechies wavelet.

The same process can carried out with respect to either the 4-term Daubechies wavelet of FIG. 2(*a*), or the 20-term Daubechies wavelet shown in FIG. 2(*b*); the 20-term wavelets were used in generating the attached Figures.

FIG. 3(*a*) shows a simulated time series for the in-phase or I component of a radar return signal (discussed in further detail below), including only turbulence. FIG. 3(*b*) shows the wavelet transform of the FIG. 3(*a*) signal, that is, a set of components generated as described above. It will be apparent that while the time series of FIG. 3(*a*) exhibits substantial randomness, the wavelet transform of FIG. 3(*b*) indicates that the wavelet transform process is capable of extracting useful signal information therefrom. More specifically, the higher amplitudes of the lower-numbered components charted in FIG. 3(*b*), as compared to the lower amplitude, higher-numbered components, are characteristic of wavelet transforms where no clutter is present. According to the invention, the higher amplitude components of the wavelet transform of the return signal are truncated and the remaining components reconstituted as a time series; the effect is to separate out and remove the radar signal return due to ground clutter from the reconstituted signal.

FIGS. 4(*a*) and 4(*b*) show respectively a simulated time series for ground clutter and its wavelet transform. As can be seen, the time series for ground clutter alone is much slower-varying than the time series for a clear air signal of FIG. 3(*a*). Correspondingly, the lower-valued components shown in the wavelet transform of FIG. 4(*b*) show relatively high amplitude. According to the invention, these high amplitude components are truncated, removing the clutter components, and the inverse transform performed. The reconstituted time series has a significant proportion of the radar return from clutter removed; the corollary is that the return from turbulence is relatively emphasized, effectively having had its signal-to-clutter ratio significantly increased. The conventional steps of measuring wind velocity from this set of samples are thus rendered more reliable.

Further examples are given in the remaining figures. FIGS. 5(a) and 5(b) show a time series for noise and its wavelet transform, respectively. "Noise" in this context refers largely to random electron movement in the signal processing circuitry and the like. Importantly, the components of noise are of equal amplitude at all scales. The randomness of the noisy signal of FIG. 5(a) is illustrated in the wavelet domain plot of FIG. 5(b), in that the components do not exhibit any pattern. An actual radar signal is the sum of all three components, that is, noise, ground clutter, and meteorological return. However, if the power spectrum of the radar signal is calculated, the clear air signal tends to be overwhelmed by the large amount of contamination due to clutter. Filtering in the wavelet domain according to the invention reduces the amplitude of the contamination due to clutter to approximately that of the clear air return. Noise can then be removed from the signal in accordance with normal radar signal processing techniques.

It will be appreciated by those of skill in the art that the usual Doppler technique involved in measuring the velocity of a radar reflector involves calculating of the in-phase (I) and the quadrature-phase (Q) values for the radar signal. These two values are necessary in order to measure the direction and velocity of a particular reflector. According to the invention, wavelet filtering is applied to the I and Q components separately. FIG. 6(a) shows simulated I and Q return signals with ground clutter contamination, and FIG. 6(b) shows the wavelet transform of the I component, that is, having been decomposed with respect to a series of Daubechies wavelets according to the invention. Again, as discussed in connection with FIG. 4, the wavelet transform shows a few relatively high amplitude components which can readily be truncated to remove contamination due to ground clutter. The truncation threshold T is set just outside the maximum amplitude of the principal portion of the wavelet transform on the right of FIG. 6(b), that is, to avoid truncation of the components due to radar return from turbulence. As the transform of the clutter in the radar return signal is concentrated into a few components by the Daubechies wavelet transform, truncation of the large-amplitude components is effective to remove most of the contamination due to clutter from the signal.

FIG. 7 shows a simulated I time series of a radar return signal before and after filtering according to the invention. Trace 30, the "before" trace, exhibits a relatively large amplitude, low frequency sinusoidal variation due to clutter, having higher frequency variations due to turbulence superimposed thereon. The reconstituted signal after filtering according to the invention is shown at 32. It will be apparent that the sinusoidal variation in "before" signal 30 due to the clutter has been removed from the "after" signal 32, that is, the smoothly varying component has been removed while preserving the detail of the turbulence.

FIG. 8 shows power spectra for this data. Such power spectra illustrate the concentration of the energy at various frequencies. The larger amplitude waveform 34 corresponds to the time series 30 before filtering and the lower amplitude 36 is the waveform of the filtered component. Obviously a significant fraction of the power has been removed, corresponding to the elimination of the clutter portion of the signal. Importantly, the clear air signal outside the frequencies where the power of the return from clutter is concentrated has not been significantly distorted.

FIG. 9 shows I and Q time series for severe ground clutter contamination from a wind profiler operating at 915 MHz. FIG. 10 shows the power spectra of the I time series, before and after filtering according to the invention; the larger amplitude dotted line 40 corresponds to the power spectrum of the signal without filtering, while the solid line 42 is of lower amplitude, corresponding to the power spectrum of the signal having been filtered according to the invention. Note that the peak in the unfiltered power spectrum 40 due to ground clutter, at about value 31 on the ordinate, has been reduced to about the same amplitude as the clear air peaks (at value 16) in the filtered power spectrum 42, without otherwise significantly distorting the general shape of the power spectra. The filtered power spectrum 42 will accordingly provide a correct Doppler shift for wind using existing peak picking algorithms for measuring wind speed.

FIG. 11 shows I and Q signals for typical sea clutter. It is known that sea clutter in 915 MHz radar return signals typically includes two broad peaks having different amplitudes due to wind-driven waves on the water surface. The dotted line 46 in FIG. 12 is the power spectrum of the I and Q signals of FIG. 11 before filtering, and the solid line 48 is the power spectrum of the same data after filtering according to the invention. The two sea clutter peaks still cause a slight bias to the clear air signal, but wind profiling would be possible using the filtered power spectrum of FIG. 12. The two peaks due to sea clutter have been reduced to about the amplitude of the clear air signal.

Migrating birds also can create errors in measured wind profiles. Algorithms are known for removing bird contamination from radar return signals but the large power reflected from birds can cause the algorithm to fail. FIG. 13 shows typical I and Q time series for bird contamination. A bird tends to create a reflected sine wave beginning at a high Doppler frequency as the bird enters the antenna beam. As the bird goes through the center of the beam, the Doppler frequency goes through zero and then increases as the bird leaves the beam. There may be more than one bird in the beam at any time, of course.

FIG. 14 shows a plot of the power spectrum of the time series of FIG. 13 before and after wavelet filtering according to the invention. Again the dotted line 50 is the power spectrum of the signal prior to wavelet filtering, and the solid line 52 indicates the power spectrum of the signal, having been filtered according to the invention. The bird return is still evident in the lower curve, but this power spectrum can be successfully processed to yield wind velocity. In the present case, it is known from balloon studies that the peak 54 represents the return from turbulence in this power spectrum.

Finally, precipitation is not usually thought of as a contaminant for purposes of wind profiling because rain acts as a tracer for the wind. That is, rain adds a significant additional reflector, increasing the meteorological radar return. Stated differently, the reflective power from rain is strong enough to overwhelm the clear air signal, so that if the rainfall velocity is measured by a vertical antenna, the wind can be profiled. FIG. 15 shows a typical I time series for heavy rain, before and after filtering according to the invention. Raindrops produce sharp spikes evident in the time domain in the unfiltered time series shown in the dashed line, while these are substantially eliminated from the filtered data shown by the dotted line. FIG. 16 shows corresponding I and Q wavelet transforms, and FIG. 17 shows corresponding power spectra before and after filtering; again, the dotted line 60 shows the power spectrum of the unfiltered data and the solid line 62 shows power spectra of the filtered rain data. The amplitude of the rain signal has been very significantly reduced, but its shape has been preserved. Wind profilers are thus able to measure wind in the presence of precipitation after employment of wavelet filtering according to the invention.

Accordingly, it can be seen that the method of the invention provides a substantial improvement in wind profiling. In essence, the use of wavelet transforms to convert a time series into wavelet space allows convenient truncation of a few components of large amplitude, due to the smoothly varying nature of the clutter return, providing an effective way of removing a significant amount of clutter from the return signal. The shape of the return from meteorological reflectors is not distorted by this process, such that the inverse transformation is effective to return the return signal to a form wherein wind profiling can be accurately carried out according to known processes.

The steps of wavelet transformation to yield a number of components, such that smoothly-varying portions of the radar return due to clutter provide large amplitude components, truncation of the high amplitude components, and performance of the inverse transformation can be readily added to existing wind profiling processes by those of skill in the art, given the disclosure above.

Therefore, while a preferred embodiment of the invention and examples thereof have been given, the invention should not be limited thereby, but only by the following claims.

What is claimed is:

1. A method of measuring wind velocity, including the step of reducing the amplitude of clutter components in a series of samples representing a radar return signal with respect to the return from meteorological reflectors, comprising the steps of:

computing wavelet transforms of the series of samples employing selected wavelet functions, in order to calculate a set of components;

identifying relatively large components from said set of components as due to smoothly-varying radar return signals from nonmeteorological reflectors;

truncating the amplitude of the identified components;

computing the inverse transform with respect to the remaining components, yielding a series of processed samples having had the return from said nonmeteorological reflectors effectively removed;

calculating the power spectrum of the series of processed samples; and analyzing the power spectrum to determine the velocity of meteorological reflectors contributing to the return signal.

2. The method of claim 1, wherein said selected wavelet functions include Daubechies wavelets.

3. The method of claim 2, wherein said Daubechies wavelets include 4- and 20-term Daubechies wavelets.

4. The method of claim 1, wherein said wavelet transforms are computed by comparing each of a number of predetermined values representing the selected wavelets to members of corresponding subsets of the series of samples of the radar return signal.

5. The method of claim 4, wherein said comparison step is performed repeatedly with respect to subsets of the series of samples and sets of predetermined values representing relatively dilated selected wavelets.

6. The method of claim 1, wherein said step of calculating the power spectrum of a series of processed samples is performed by Fourier transformation of the series of processed samples.

* * * * *